(12) United States Patent
Balagopal et al.

(10) Patent No.: US 7,824,536 B2
(45) Date of Patent: *Nov. 2, 2010

(54) ELECTROLYTIC METHOD TO MAKE ALKALI ALCOHOLATES USING CERAMIC ION CONDUCTING SOLID MEMBRANES

(75) Inventors: Shekar Balagopal, Sandy, UT (US); Justin Pendleton, Salt Lake City, UT (US); Robin Richards, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 787 days.

This patent is subject to a terminal disclaimer.

(21) Appl. No.: 11/449,953

(22) Filed: Jun. 9, 2006

(65) Prior Publication Data

US 2006/0226022 A1    Oct. 12, 2006

(51) Int. Cl.
C25B 3/00    (2006.01)

(52) U.S. Cl. .................. 205/450; 205/451; 205/452; 205/453; 205/454; 205/457

(58) Field of Classification Search ......... 205/450–454, 205/457
See application file for complete search history.

(56) References Cited

U.S. PATENT DOCUMENTS

| | | | |
|---|---|---|---|
| 3,197,392 A | 7/1965 | Silversmith et al. |
| 3,730,857 A | 5/1973 | Tripp |
| 3,964,983 A | 6/1976 | Eisenbach et al. |
| 4,217,184 A | 8/1980 | Kuck et al. |
| 4,250,000 A | 2/1981 | Kuck et al. |
| 4,857,665 A | 8/1989 | Hinrichs et al. |
| 4,990,413 A | 2/1991 | Lee et al. |
| 5,246,551 A | 9/1993 | Pletcher et al. |
| 5,286,354 A | 2/1994 | Bard et al. |
| 5,290,404 A | 3/1994 | Toomey |
| 5,290,405 A | 3/1994 | Joshi et al. |
| 5,389,211 A | 2/1995 | Sharifian et al. |
| 5,425,856 A | 6/1995 | Buckholtz et al. |

(Continued)

FOREIGN PATENT DOCUMENTS

DE    139528    1/1980

(Continued)

OTHER PUBLICATIONS

Young, "International Search Report for PCT/US07/00968 sent Oct. 1, 2007", 1-2.

(Continued)

*Primary Examiner*—Arun S Phasge
(74) *Attorney, Agent, or Firm*—David Fonda

(57) ABSTRACT

Disclosed are processes of making solutions of alkali alkoxides in their corresponding alcohols using an electrolytic process. In one embodiment, sodium methoxide in methanol is made from methanol and aqueous sodium hydroxide solution, where the aqueous sodium hydroxide solution is present in the anolyte compartment and a solution of sodium methoxide in methanol is present in the catholyte compartment, the two compartments are separated by a ceramic membrane that selectively transports sodium ions under the influence of an electric potential, and wherein the composition of the solution of sodium methoxide in methanol in the catholyte compartment of the electrolytic cell comprises between at least about 2% by weight sodium methoxide and at most about 20% by weight sodium methoxide.

34 Claims, 4 Drawing Sheets

U.S. PATENT DOCUMENTS

| | | | |
|---|---|---|---|
| 5,575,901 | A | 11/1996 | Hulme et al. |
| 5,578,189 | A | 11/1996 | Joshi |
| 5,580,430 | A | 12/1996 | Balagopal et al. |
| 5,968,326 | A | 10/1999 | Yelon et al. |
| 5,985,388 | A | 11/1999 | Tomita et al. |
| 6,004,445 | A | 12/1999 | Genders et al. |
| 6,190,407 | B1 | 2/2001 | Ogle et al. |
| 6,221,225 | B1 | 4/2001 | Mani |
| 6,333,093 | B1 | 12/2001 | Burrell et al. |
| 6,398,938 | B2 | 6/2002 | Merk et al. |
| 6,573,205 | B1 | 6/2003 | Myers et al. |
| 6,770,187 | B1 | 8/2004 | Putter et al. |
| 6,805,787 | B2 | 10/2004 | Bess et al. |
| 2003/0106805 | A1* | 6/2003 | Horn .......................... 205/450 |
| 2005/0177008 | A1 | 8/2005 | Balagopal et al. |
| 2005/0204612 | A1 | 9/2005 | Connemann et al. |
| 2005/0262760 | A1 | 12/2005 | Lawson et al. |
| 2006/0169594 | A1 | 8/2006 | Balagopal et al. |
| 2007/0138020 | A1 | 6/2007 | Balagopal et al. |
| 2007/0158205 | A1 | 7/2007 | Balagopal et al. |
| 2008/0142373 | A1 | 6/2008 | Joshi et al. |
| 2008/0173540 | A1 | 7/2008 | Joshi et al. |
| 2008/0173551 | A1 | 7/2008 | Joshi et al. |
| 2008/0245671 | A1 | 10/2008 | Balagopal et al. |

FOREIGN PATENT DOCUMENTS

| | | |
|---|---|---|
| DE | 3346131 | 6/1985 |
| DE | 3702052 | 7/1988 |
| DE | 19603181 | 4/1997 |
| DE | 10360758 | 7/2005 |
| EP | 0559400 | 9/1993 |
| EP | 0826794 | 3/1998 |
| GB | 115927 | 6/1969 |
| GB | 1155927 | 6/1969 |
| HU | 37469 | 12/1985 |
| JP | 53011199 | 2/1978 |
| JP | 59067379 | 4/1984 |
| JP | 07196561 | 8/1995 |
| RO | 103535 | 6/1993 |
| WO | WO-9627697 | 9/1996 |
| WO | WO 03/014272 A3 | 2/2003 |

OTHER PUBLICATIONS

Young, "Written Opinion for PCT/US07/00968 sent Oct. 1, 2007", 1-5.

Young, "International Search Report for PCT/US06/48746 sent Oct. 1, 2007", 1-2.

Young, "Written Opinion for PCT/US06/48746 sent Oct. 1, 2007", 1-4.

"International Search Report", *International Search Report* from corresponding PCT application PCT/US2004/041587, Mailed Dec. 21, 2005.

Balagopal, S., et al., "Selective Sodium Removal From Aqueous Waste Streams with NaSICON Ceramics", *Separation and Purification Technology*, 15(1999),231-237.

Biolot, J.P., et al., "Stoichiometry-Structure-Fast Ion Conduction in the NaSICON Solid Solution", *Solid State Ionics*, 28-30 (1988), North-Holland, Amsterdam,403-410.

Goodenough, J.B., et al., "Fast Na+ -Ion Transport in Skeleton Structures", *Mat. Res. Bull.*, vol. 11, 1976. Pergamon Press, Inc. Printed in the United States,203-220.

Hamann, et al., "Transport and conversion processes in the direct electrochemical synthesis of alcoholates with Nafion membranes", *Chemie Ingenieur Technik*, 1992, 64(7),648-649.

Hong, H.Y-P., "Crystal Structures and Crystal Chemistry in the System Na1+xZr2SixP3−xO12", *Mat. Res. Bull.*, vol. 11, 1976. Pergamon Press, Inc. Printed in the United States.,173-186.

Koter, S., "Electrosynthesis of methanolates by membrane electrolysis", *Polish Journal of Chemistry*, 1997, 71(2),232-243.

Shannon, R.D., et al., "Inonic Conductivity in Na5YSi4O12 Type Silicates", *Inorganic Chemistry*, vol. 17, No. 4 (1978),958-964.

Sridhar, S., "Electrodialysis in a non-aqueous medium: production of sodium methoxide", *Journal of Membrane Science*, 1996, 113(1),73-79.

Strathmann, H., "Bipolar membranes: their properties and applications", *Clean and Efficient Processing: Electrochemical Technology for Synthesis, Separations, Recyle, and Environmental Improvement, international Forum, electrolysis in the Chemical Industry*, 12th, Clearwater Beach, Fla.,,(Oct. 11, 1998),221-251.

Sutija, Davor, et al., "Ceramic Cleansers: Environmental Uses of Sodium Super-Ionic Conducting Ceramics", *The Electrochemical Society Interface*, Winter 1996, vol. 5, No. 4,26-30.

Young, "International Search Report for PCT/US07/25541 sent Mar. 17, 2008", 1-2.

Young, "Written Opinion for PCT/US07/25541 sent Mar. 17, 2008", 1-6.

Alamo, J. "Chemistry and properties of solids with the [NZP] skeleton", *Solid State Ionics*, vol. 63-65, (1993), 547-561.

Bentzen, J. J., et al., "The preparation and characterization of dense, highly conductive $Na_5GdSi_4O_{12}$ nasicon (NGS)", *Materials Research Bulletin*, vol. 15, (1980), 1737-1745.

Delmas, C. et al., "Crystal chemistry of the $Na_{1+x}Zr_{2-x}L_x(PO_4)_3$ (L = Cr, In, Yb) solid solutions", *Materials Research Bulletin*, vol. 16, (1981), 285-290.

Desbois, V. "Written Opinion of the International Searching Authority from PCT application PCT/US/2004/041587", (Dec. 21, 2005), 1-9.

Fujitsu, S. et al., "Conduction paths in sintered ionic conductive material $Na_{1+x}Y_xZr_{2-x}(PO_4)_3$", *Materials Research Bulletin*, vol. 16, (1981), 1299-1309.

Miyajima, Y. et al., "Ionic conductivity of NASICON-type $Na_{1+x}M_xZr_{2-x}P_3O_{12}$(M: Yb, Er, Dy)", *Solid State Ionics*, vol. 84, (1996), 61-64.

Saito, Y. et al., "Ionic Conductivity of NASICON-type conductors $Na_{1.5}M_{0.5}Zr_{1.5}(PO_4)_3$ (M: $Al^{3+}$, $Ga^{3+}$, $Cr^{3+}$, $Sc^{3+}$, $Fe^{3+}$, $In^{3+}$, $Yb^{3+}$, $Y^{3+}$)", *Solid State Ionics*, vol. 58, (1992), 327-331.

Shimazu, K. et al., "Electrical conductivity and $Ti^{4+}$ ion substitution range in NASICON system", *Solid State Ionics*, vol. 79, (1995), 106-110.

Van Gerpen, J. et al., "Biodiesel Production Technology", *National Renewable Energy Laboratory*, NREL/SR-510-36244, (Jul. 2004), 1-110.

Von Alpen, V. et al., "Compositional dependence of the electrochemical and structural parameters in the NASICON system $(Na_{1+x}Si_xZr_2P_{3-x}O_{12})$", *Solid State Ionics*, vol. 3/4, (1981), 215-128.

De Jonge, Janos et al., Abstract of HU37469, (Dec. 28, 1985), 1.

Hamann, Carl H., et al., Abstract and claims of DE19603181, (Apr. 17, 1997), 1-2.

Hamann, Carl H., et al., Corresponding abstract DE3346131 (EP0146771), (Jun. 27, 1985), 1.

Horn, Michael Abstract of DE10246375, (May 15, 2003), 1.

Kuhn, Amselm T., et al., Abstract of GB1155927, (Jun. 25, 1969), 1-2.

Lehmann, Thomas et al., Abstract of DE10360758, (Jul. 28, 2005), 1-2.

Oku, Toshio et al., Abstract of JP53011199, (Feb. 1, 1978), 1.

Rooney, K. Abstract and International Search Report for WO03014272, (Nov. 2, 2003) 1-6.

Satou, Hiroshi et al., Abstract of JP59067379, (Apr. 17, 1984), 1.

Cho, Tsurahide et al., Abstract of JP07196561, Patent answer 8 of 19 in enclosed search by Science IP, (Aug. 1, 1995), 8.

Radoi, Ion et al., Abstract of RO103535, Patent answer 10 of 19 in enclosed search by Science IP, (Jun. 15, 1993), 10-11.

Machlitt, Rainer et al., Abstract of DD139528, Patent answer 19 of 19 in enclosed search by Science IP, (Jan. 9, 1980), 14.

Phasge, Office Action for U.S. Appl. No. 11/010,822 sent Jun. 30, 2008, 1-6.

Young, Lee W., "International Search Report", (Jul. 7, 2008),1-2.

Young, Lee W., "Written Opinion of the International Searching Authority", (Jul. 7, 2008),1-5.

Young, Lee W., "International Search Report", (Dec. 18, 2008),1-2.

Young, Lee W., "Written Opinion of the International Searching Authority", (Dec. 18, 2008),1-5.
Young, Lee W., "International Search Report", (Apr. 24, 2009),1-3.
Young, Lee W., "Written Opinion of the International Searching Authority", (Apr. 24, 2009),1-5.
Phasge, Arun S., "Office Action for U.S. Appl. No. 11/396,057", (Oct. 10, 2008),1-8.
Hinrichs, et al., "Abstract of DE3702052", *Patent Answer 14 of 19 in enclosed search by Science IP*, (Jul. 14, 1988),11.
Phasge, Arun "Final Office Action for U.S Appl. No. 11/396,057", (Jul. 23, 2009).
Phasge, Arun "Non-Final Office Action for U.S. Appl. No. 11/396,057", (Dec. 24, 2009).
Phasge, Arun "Final Office Action for U.S. Appl. No. 11/010,822", (Jul. 10, 2009).
Phasge, Arun "Non-Final Office Action for U.S. Appl. No. 11/010,822", (Dec. 28, 2009).
Gregg, Nicholas "European Search Report", European Application No. 06847897.3, PCT App. No. PCT/US2006048746,(Sep. 16, 2009),1-4.

* cited by examiner

ELECTROLYTIC METHOD TO MAKE ALKALI ALCOHOLATES USING CERAMIC ION CONDUCTING SOLID MEMBRANES

RELATED APPLICATION INFORMATION

This application claims priority to U.S. Provisional Patent Application No. 60/528,612, filed Dec. 11, 2003; to U.S. Utility patent application Ser. No. 11/010,822, to Shekar Balagopal and Vinod K. Malhotra, entitled "Electrolytic Method to Make Alkali Alcoholates using Ceramic Ion Conducting Solid Membranes," filed Dec. 13, 2004; and to U.S. Utility patent application Ser. No. 11/396,057 to Shekar Balagopal and Vinod K. Malhotra, entitled "Electrolytic Method to Make Alkali Alcoholates Using Ceramic Ion Conducting Solid Membranes," filed Mar. 31, 2006. Each of these applications is incorporated herein in its entirety by this reference.

BACKGROUND OF THE INVENTION

1. Field of the Invention

This invention relates to electrochemical production of alkali alcoholates, also called alkali alkoxides, and more particularly to the electrochemical production of alkali alcoholates from alkali metal salt solutions and alcohol using an electrolytic cell having an alkali-ion conducting ceramic solid electrolyte membrane.

2. Description of the Related Art

Alkali alcoholates are chemical compounds that are used in a wide variety of industrial applications. Electrolytic systems have been proposed for use in producing alkali alcoholates from salt solutions. In these systems, various ion-conducting membranes may be positioned between anolyte and catholyte compartments for transportation of ions through the membrane from one compartment to the other. The membranes are often electrolytes made of polymeric materials, or combinations of ceramic and polymeric materials.

Polymeric materials are often used as electrolytes in the electrolysis of salt solutions because of their high conductivity and resistance to acidic and caustic environments. One disadvantage of polymers, however, is their low selectivity for ionic species. They may permit the desired alkali metal ions to pass through the membrane, but they also allow the electroosmotic transport of water, the result of which is an inefficient operation of the electrolytic cell.

Another method of making sodium methylate, also called sodium methoxide, is a sodium-based process in which sodium metal is reacted with methanol to produce sodium methoxide. This method uses sodium metal as a raw material. However, sodium metal is expensive and it may react violently with lower alcohols, thus rendering the process difficult to control. Sodium metal also reacts violently with water requiring elaborate and expensive equipments and systems for storage, handling, and delivery of sodium metal.

Other methods may include making sodium methoxide from a sodium amalgam produced from the chlor-alkali electrolysis in a mercury cell, by reacting amalgam with alcohol. The drawback of this process is that it can result in the contamination of the product and the environment with mercury, a well known carcinogen. For this reason, use of sodium methoxide produced by this method is, in many cases, unattractive for agriculture, pharmaceuticals, and bio-diesel applications.

Thus, it would be an improvement in the art to provide less expensive, more efficient methods of producing alkali alkoxides from alkali metal salt solutions using an alkali-ion conducting ceramic solid electrolyte or ceramic membrane. It would further be an advancement in the art to provide such a method of making alkali alkoxides that is simple, safe, and environmentally benign. Such a method is provided herein.

SUMMARY OF THE INVENTION

The present invention has been developed in response to the present state of the art, and in particular, in response to the problems and needs in the art that have not yet been fully solved by currently available processes for making alkali alcoholates. Accordingly, the present invention has been developed to provide a method for making alkali alcoholates that overcome many or all of the above-discussed shortcomings in the art.

In accordance with the present invention, there is provided herein a method of making alkali alkoxides. In one embodiment, the method comprises introducing a first solution of alcohol or a solution of alkali alkoxide in alcohol into a catholyte compartment of an electrolytic cell, introducing a second solution of an alkali metal salt solution into an anolyte compartment of the electrolytic cell. The anolyte compartment and the catholyte compartment of the electrolytic cell may be separated by an alkali-ion conducting membrane. An, electric potential is applied across the electrolytic cell to selectively transport the alkali metal cations from the anolyte compartment to the catholyte compartment where the alkali metal cations react with the alcohol to form an alkali alkoxide. Selectivity of transport or ion selectivity of a membrane is often a function of the membrane. For example, the membrane may be manufactured to only allow certain ions to transport through. Thus, the membrane is "selective" to that particular ion. In one embodiment, the composition of the solution of alkali alkoxide in alcohol in the catholyte compartment of the electrolytic cell is between about 2% by weight alkali alkoxide and about 20% by weight alkali alkoxide. In some embodiments, the ceramic membrane is substantially impermeable to water and operates at a high current density, and/or operates at a low voltage. In one embodiment the composition of the solution of alkali alkoxide in alcohol in the catholyte compartment of the electrolytic cell is between about 3% by weight alkali alkoxide and at about 15% by weight alkali alkoxide. In another embodiment the composition of the solution of alkali alcoxide in the catholyte compartment of the electrolytic cell is between 5% by weight alkali alcoxide and about 13% by weight alkali alcoxide.

In one embodiment of the methods of the present invention, there is provided a method for producing solutions of sodium methoxide in methanol.

The specific embodiments above may be adapted to other alkali metal cations and other alcohols, for the full scope of the invention disclosed herein, as will be readily apparent to those skilled in the art.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWING

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
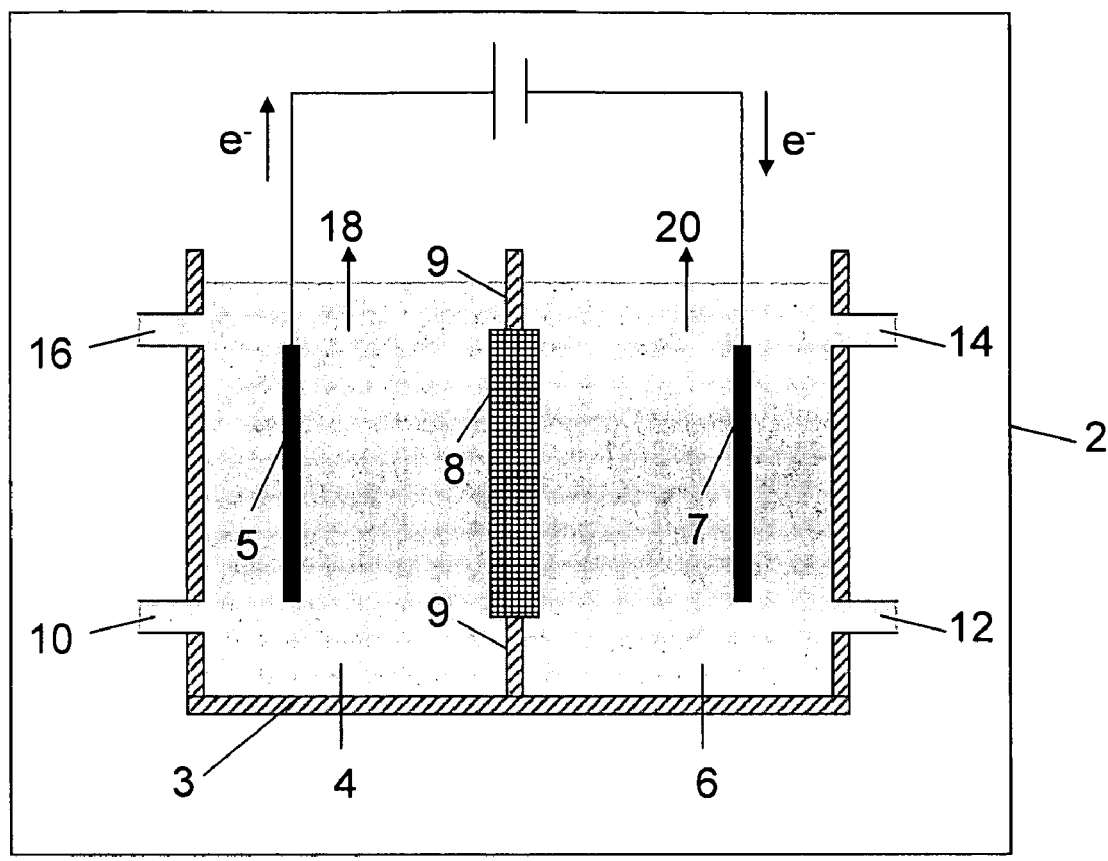
FIG. 1 is a schematic representation of one embodiment of an electrolytic cell in accordance with the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of cells, membranes, processes, methods, etc., to provide a thorough understanding of embodiments of the invention. One skilled in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

The embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the two-compartment electrolytic cell using alkali-ion conducting ceramic membranes of the present invention, and processes using the two-compartment electrolytic cell as represented in FIG. 1 through FIG. 4, is not intended to limit the scope of the invention, as claimed, but is merely representative of the embodiments of the invention.

Disclosed herein are processes or methods for the production of non-aqueous alkali alkoxides by electrolysis of an aqueous alkali metal salt solution in an electrolytic cell. Alkali alkoxides are sometime referred to as alkali alcoholates. In one embodiment, the process includes the use of sodium-ion conducting ceramic membranes. The method may include making solutions of sodium methoxide in methanol in an electrolytic cell from methanol and aqueous sodium hydroxide solution. The process described herein may also be used to make other alkali alkoxides in the corresponding alcohol in an electrolytic cell from alcohol and aqueous alkali metal salt solutions. For example, in one embodiment, the alkyl group is a lower alkyl. The processes and methods of the present invention could also be used to make other alkoxides, including, but no limited to methoxide, ethoxide, n-propoxide (propan-1-ol), isopropoxide (propan-2-ol), n-butoxide (butan-1-ol), tert-butoxide (2-methylpropan-2-ol), and tert-amoxide (2-methylbutan-2-ol). It will be appreciated by those of skill in the art that these alkoxides are commonly offered commercially as dry powders, as solutions in the parent alcohol, or quite often as solutions in other solvents such as cyclohexane, toluene, and tetrahydrofuran. Other alkoxides and forms of alkoxides are known to those of ordinary skill in the art and are included within the scope of the invention. Corresponding alcohols used to make alkoxides may include without limitation, methanol, ethanol, n-propanol, isopropanol, n-butanol, tert-butanol, tert-amyl alcohol and combinations thereof.

Referring to FIG. 1, there is provided a schematic representation of an electrolytic cell 2 that can be used in the methods for producing alkali alkoxides according to the present invention described herein. In one embodiment, electrolytic cell 2 is used to make solutions of sodium methoxide in methanol. The electrolytic cell 2 includes a container or shell 3, which may be corrosion resistant. An electrolyte membrane 8, which may be positioned in or supported by a scaffold or holder 9, together with the container 3 defines a catholyte compartment 6, and an anolyte compartment 4. The anolyte compartment 4 is configured with an anode 5 and the catholyte compartment 6 is configured with a cathode 7.

The container 3, and other parts of the cell 2, may be made of any suitable material, including metal, glass, plastics, composite, ceramic, other materials, or combinations of the foregoing. The material that forms any portion of the electrolytic cell 2 is preferably not reactive with or substantially degraded by the chemicals and conditions that it is exposed to as part of the process.

The electrolytic cell 2 further comprises an anolyte inlet 10 for introducing chemicals into the anolyte compartment 4 and an anolyte outlet 16 for removing or receiving anolyte solution from the anolyte compartment 4. The cell 2 also includes a catholyte inlet 12 for introducing chemicals into the catholyte compartment 6 and a catholyte outlet 14 for removing or receiving catholyte solution from the catholyte compartment 6. It will be appreciated by those of skill in the art that the cell configuration and relative positions of the inlets and outlets may vary while still practicing the teachings of the invention.

Because gases may be evolved from the cell during operation, venting means (18, 20) are provided to vent, treat and/or collect gases from the anolyte compartment 4 and/or catholyte compartment 6. The means may be a simple venting system such as openings, pores, holes, and the like. The venting means may also include without limitation, a collection tube, hose, or conduit in fluid communication with an airspace or gap above the fluid level in the anolyte and/or catholyte compartments. The gases which are evolved may be collected, vented to outside the electrolytic cell, sent through a scrubber or other treatment apparatus, or treated in any other suitable manner.

The anode 5 and cathode 7 materials may be good electrical conductors stable in the media to which they are exposed. Any suitable material may be used, and the material may be solid, plated, perforated, expanded, or the like. In one embodiment, the anode 5 and cathode 7 material is a dimensionally stable anode (DSA) which is comprised of ruthenium oxide coated titanium ($RuO_2$/Ti). Suitable anodes 5 can also be formed from nickel, cobalt, nickel tungstate, nickel titanate, platinum and other noble anode metals, as solids plated on a substrate, such as platinum-plated titanium. Stainless steel, lead, graphite, tungsten carbide and titanium diboride are also useful anode materials. Suitable cathodes 7 may be formed from metals such as nickel, cobalt, platinum, silver and the like. The cathodes 7 may also be formed from alloys such as titanium carbide with small amounts of nickel. In one embodiment, the cathode is made of titanium carbide with less than about 3% nickel. Other embodiments include cathodes the include $FeAl_3$, $NiAl_3$, stainless steel, perovskite ceramics, and the like. Graphite is also a useful cathode material. In some embodiments, the electrodes are chosen to maximize cost efficiency effectiveness, by balancing electrical efficiency with low cost of electrodes.

The electrode material may be in any suitable form within the scope of the present invention, as would be understood by one of ordinary skill in the art. In some specific embodiments, the form of the electrode materials may include at least one of the following: a dense or porous solid-form, a dense or porous layer plated onto a substrate, a perforated form, an expanded form including a mesh, or any combination thereof.

In some embodiments, only electrolytic reactions occur in the cell and galvanic reactions are eliminated or greatly minimized. Accordingly, alkali-ion conducting ceramic membranes 8 may include those which eliminate or minimize galvanic reactions and promote only electrolytic reactions. In one embodiment, the membrane 8 has high ionic conductivity with minimal or negligible electronic conductivity. The membrane may have high selectivity to preferred ionic species. The membrane 8 may also physically separate the anolyte compartment from the catholyte compartment. This may be accomplished using a dense ceramic electrolyte.

The alkali-ion conducting ceramic membrane 8 selectively transports a particular, desired alkali metal cation species from the anolyte to the catholyte side even in the presence of other cation species. The alkali-ion conducting ceramic membrane 8 may also be impermeable to water and/or other undesired metal cations. In some specific embodiments, the ceramic membrane 8 has a current density from about 0.3 to about 1 amp/in$^2$ (about 50 to about 150 mA/cm$^2$). In one embodiment, the current through the alkali-ion conducting ceramic is predominately ionic current.

In some specific embodiments, the alkali-ion conducting ceramic membranes 8 are essentially impermeable to at least the solvent components of both the first or catholyte solution and second or anolyte solution. These alkali-ion conducting ceramic solid electrolytes or ceramic membranes 8 may have low or even negligible electronic conductivity, which virtually eliminates any galvanic reactions from occurring when an applied potential or current is removed from the cell containing the membrane 8. In another embodiment, these alkali-ion conducting ceramic solid electrolyte or ceramic membranes 8 are selective to a specific alkali metal ion and hence a high transference number of preferred species, implying very low efficiency loss due to near zero electro-osmotic transport of water molecules.

A variety of alkali-ion conducting ceramic materials are known in the art and would be suitable for constructing the alkali-ion conducting ceramic solid electrolyte or ceramic membrane 8 of the present invention, as would be understood by one of ordinary skill in the art. In accordance with the present invention, in some specific embodiments alkali-ion conducting ceramic membrane 8 compositions comprising NaSICON (Sodium Super Ionic Conductors) materials are utilized for their characteristics of high ion-conductivity for sodium ions at low temperatures, selectivity for sodium ions, current efficiency and chemical stability in water, ionic solvents, and corrosive alkali media under static and electrochemical conditions. Such alkali-ion conducting ceramic membranes 8 may have one or more, or all, of the following desirable characteristics which make them suitable for aqueous and non-aqueous electrochemical applications. One characteristic is that, being dense, the ceramic membrane 8 is at least substantially impervious to water transport, and is not influenced by scaling or precipitation of divalent ions, trivalent ions, and tetravalent ions or dissolved solids present in the solutions. The ceramic membrane 8 may selectively transport sodium ions in the presence of other ions at a transfer efficiency that is in some instances above 95%. In yet another embodiment the ceramic membrane 8 provides resistance to fouling by precipitants, and/or electro-osmotic transport of water, which is common with organic or polymer membranes.

As noted above, in some specific embodiments, the cation conducted by the alkali-ion conducting ceramic membrane 8 is the sodium ion ($Na^+$). In some specific embodiments, sodium-ion conducting ceramic membranes include alkali-ion conducting ceramic membrane 8 compositions comprising NaSICON materials of general formula $Na_{1+x}Zr_2Si_xP_{3-x}O_{12}$ where $0 \leq x \leq 3$. The membrane 8 may include NaSICON materials of general formula $Na_5RESi_4O_{12}$ and non-stoichiometric sodium-deficient materials of general formula $(Na_5RESi_4O_{12})_{1-\delta}(RE_2O_3.2SiO_2)_\delta$, where RE is Nd, Dy, or Sm, or any mixture thereof and where $\delta$ is the measure of deviation from stoichiometry. Other analogs of NaSICON materials to transport alkali ions such as Li and K, to produce other alkali alkoxides are known to those of ordinary skill in the art, and their use is encompassed within the scope of this invention. These alkali-ion conducting ceramic membranes comprising NaSICON materials or comprising analogs of NaSICON materials are particularly useful in electrolytic systems for simultaneous production of alkali alkoxides, by electrolysis of alkali (e.g., sodium) salt solutions. In specific methods, a solid sodium-ion conducting ceramic membrane 8 separates two compartments of a cell. The sodium ions transfer across the membrane 8 from the anolyte to the catholyte compartment under the influence of electrical potential to generate sodium alkoxides. Certain alkali-ion conducting membranes do not allow transport of water there through, which is useful in making the water-free alkali alkoxides. Furthermore, these ceramic membranes have low electronic conductivity, superior corrosion resistance, and high flux of specific alkali ions providing high ionic conductivity.

In some specific embodiments, the alkali-ion conducting ceramic membrane 8 compositions comprising NASICON materials may include at least one of the following: materials of general formula $M_{1+x}M'_2Si_xP_{3-x}O_{12}$ where $0 \leq x \leq 3$, where M is selected from the group consisting of Li, Na, K, or Ag, or mixture thereof, and where $M^I$ is selected from the group consisting of Zr, Ge, Ti, Sn, or Hf, or mixtures thereof, materials of general formula $Na_{1+z}L_zZr_{2-z}P_3O_{12}$ where $0 \leq z \leq 2.0$, and where L is selected from the group consisting of Cr, Yb, Er, Dy, Sc, Fe, In, or Y, or mixtures or combinations thereof; materials of general formula $M^{II}_5RESi_4O_{12}$, where $M^{II}$ may be Li, Na, or Ag, or any mixture or combination thereof, and where RE is Y or any rare earth element. In some specific embodiments, the NASICON materials may include at least one of the following: non-stoichiometric materials, zirconium-deficient (or sodium rich) materials of general formula $Na_{1+x}Zr_{2-x/3}Si_xP_{3-x}O_{12-2x/3}$ where $1.55 \leq x \leq 3$. In some specific embodiments, the alkali-ion conducting ceramic membrane 8 compositions comprising NASICON materials may include at least one of the following: non-stoichiometric materials, sodium-deficient materials of general formula $Na_{1+x}(A_yZr_{2-y})(Si_zP_{3-z})_{12-\delta}$ where A is selected from the group consisting of Yb, Er, Dy, Sc, In, or Y, or mixtures or combinations thereof, $1.8 \leq x \leq 2.6$, $0 \leq y \leq 0.2$, $x < z$, and $\delta$ is selected to maintain charge neutrality. In some specific embodiments, the NASICON materials may include sodium-deficient materials of formula $Na_{3.1}Zr_2Si_{2.3}P_{0.7}O_{12-\delta}$.

While the alkali-ion conducting ceramic materials disclosed herein encompass or include many formulations of NaSICON materials, this disclosure concentrates on an examination of ceramic membranes comprising NaSICON materials for the sake of simplicity. The focused discussion of NaSICON materials as one example of materials is not, however, intended to limit the scope of the invention. For example, the materials disclosed herein as being highly conductive and having high selectivity include those alkali super ion conducting materials that are capable of transporting or conducting any alkali cation, such as sodium (Na), lithium (Li), potassium (K), ions for producing alkali alkoxides.

The alkali-ion conducting ceramic membranes comprising NaSICON materials may be used or produced for use in the processes and apparatus of the present invention in any suitable form, as would be understood by one of ordinary skill in the art. In some specific embodiments, the form of the alkali-ion conducting ceramic membranes may include at least one of the following: monolithic flat plate geometries, supported structures in flat plate geometries, monolithic tubular geometries, supported structures in tubular geometries, monolithic honeycomb geometries, or supported structures in honeycomb geometries. In another embodiment, the membrane 8 may be a supported membrane 8 known to those of skill in the art. Supported structures or membranes may comprise dense layers of ion-conducting ceramic solid electrolyte supported on porous supports. A variety of forms for the supported membranes are known in the art and would be suitable for providing the supported membranes for alkali-ion conducting ceramic membranes with supported structures, including: ceramic layers sintered to below full density with resultant continuous open porosity, slotted-form layers, perforated-form layers, expanded-form layers including a mesh, or combinations thereof. In some embodiments, the porosity of the porous supports is substantially continuous open-porosity so that the liquid solutions on either side of the alkali-ion conducting ceramic membrane 8 may be in intimate contact with a large area of the dense-layers of alkali-ion conducting ceramic solid electrolytes, and in some, the continuous open-porosity ranges from about 30 volume % to about 90 volume %. In some embodiments of the present invention, the porous supports for the supported structures may be present on one side of the dense layer of alkali-ion conducting ceramic solid electrolyte. In some embodiments of the present invention, the porous supports for the supported structures may be present on both sides of the dense layer of alkali-ion conducting ceramic solid electrolyte. A cell employing NaSICON flat circular disc is illustrated in FIG. 1, where concentrated sodium methoxide is formed in the catholyte compartment.

A variety of materials for the porous supports or supported membranes are known in the art and would be suitable for providing the porous supports for alkali-ion conducting ceramic membranes with supported-structures, including: electrode materials, NASICON-type materials, $\beta'$-alumina, $\beta''$-alumina, other ion-conducting ceramic solid electrolyte materials, and non-conductive materials such as plastics or ceramic materials, metals, and metal alloys. The thickness of the dense layer of alkali-ion conducting ceramic solid electrolyte material in monolithic structures is generally from about 0.3 mm to about 5 mm, and in some instances from about 0.5 mm to about 1.5 mm. The thickness of the dense layer of alkali-ion conducting ceramic solid electrolyte material in supported-structures is generally from about 25 μm to about 2 mm, and often from about 0.5 mm to about 1.5 mm. Layers as thin as about 25 μm to about 0.5 mm are readily producible, as would be understood by one of ordinary skill in the art. In some specific embodiments, the alkali-ion conducting ceramic membranes are structurally supported by the cathode, which is porous. This may dictate characteristics of both the form of the alkali-ion conducting ceramic membranes, and/or of the cathode and/or anode. In some specific embodiments, the porous substrate has similar thermal expansion and good bonding with the alkali-ion conducting ceramic membrane 8 as well as good mechanical strength. One of ordinary skill in the art would understand that the number and configuration of the layers used to construct the alkali-ion conducting ceramic membrane 8 as supported-structures could be widely varied within the scope of the invention.

In some embodiments of the alkali-ion conducting ceramic membranes of the present invention, the alkali-ion conducting ceramic membranes may be composites of alkali-ion conducting ceramic solid electrolyte materials with non-conductive materials, where the non-conductive materials are poor ionic and electronic electrical conductors under the conditions of use. A variety of insulative non-conductive materials are also known in the art, as would be understood by one of ordinary skill in the art. In some specific embodiments, the non-conductive materials may include at least one of the following: ceramic materials, polymers, and/or plastics that are substantially stable in the media to which they are exposed.

Layered alkali-ion conducting ceramic-polymer composite membranes are also particularly suitable for use as alkali-ion conducting ceramic membranes in the present invention. Layered alkali-ion conducting ceramic-polymer composite membranes generally comprise ion-selective polymers layered on alkali-ion conducting ceramic solid electrolyte materials. In some specific embodiments, the alkali-ion conducting ceramic solid electrolyte materials of the layered alkali-ion conducting ceramic-polymer composite membranes may include at least one of the following: NASICON-type materials or beta-alumina. Ion-selective polymer materials have the disadvantage of having poor selectively to sodium ions, yet they demonstrate the advantage of high chemical stability. Therefore, layered alkali-ion conducting ceramic-polymer composite membranes of alkali-ion conducting ceramic materials with chemically stable ionic-selective polymer layers may be suitable for use in the present invention. In some specific embodiments, the types of ion-selective polymer materials which may be used in the layered alkali-ion conducting ceramic-polymer composite structure may include at least one of the following: polyelectrolyte perfluorinated sulfonic polymers, polyelectrolyte carboxylic acid polymers, Nafion® materials (from E.I. du Pont de Nemours, Wilmington, Del.) and polyvinyl chloride (PVC), matrix-based polymers, co-polymers or block-copolymers.

In some specific embodiments, the polymers for the layered alkali-ion conducting ceramic-polymer composite membranes may include at least one of the following features and use characteristics, as would be understood by one of ordinary skill in the art: high chemical stability; high ionic conductivity; good adhesion to alkali-ion conducting ceramic materials; and/or insensitivity to impurity contamination.

In some specific embodiments, the alkali-ion conducting ceramic membrane 8 may comprise two or more co-joined layers of different alkali-ion conducting ceramic membrane 8 materials. Such co-joined alkali-ion conducting ceramic membrane 8 layers could include NaSICON materials joined to other alkali-ion conducting ceramic materials, such as, but not limited to, beta-alumina. Such co-joined layers could be joined to each other using a method such as, but not limited to, thermal spraying, plasma spraying, co-firing, joining following sintering, etc. Other suitable joining methods are known by one of ordinary skill in the art and are included herein.

The alkali-ion conducting ceramic solid electrolyte materials disclosed herein are particularly suitable for use in the electrolysis of alkali metal salt solutions because they have high ion-conductivity for alkali metal cations at low temperatures, high selectivity for alkali metal cations, good current efficiency and stability in water and corrosive media under static and electrochemical conditions. Comparatively, beta alumina is a ceramic material with high ion conductivity at temperatures above 300° C., but has low conductivity at temperatures below 100° C., making it less practical for applications below 100° C.

Sodium ion conductivity in NaSICON structures has an Arrhenius dependency on temperature, generally increases as a function of temperature. The sodium ion conductivity of ceramic membranes comprising NaSICON materials ranges from about $1 \times 10^{-4}$ S/cm to about $1 \times 10^{-1}$ S/cm from room temperature to 85° C.

Alkali-ion conducting ceramic membranes comprising NaSICON materials, especially of the type described herein, have low or negligible electronic conductivity, and as such aid in virtually eliminating the occurrence of any galvanic reactions when the applied potential or current is removed. Certain NaSICON analogs according to the present invention have very mobile cations, including, but not limited to lithium, sodium, and potassium ions, that provide high ionic conductivity, low electronic conductivity and comparatively high corrosion resistance.

The sodium-ion conducting ceramic materials referred herein for use in electrolytic cells can be used successfully in the formation of sodium alkoxides from the electrolysis of aqueous sodium salt solutions, including, but not limited to, such solutions as sodium carbonate, sodium nitrate, sodium phosphate, sodium hypochlorite, sodium chloride, sodium perchlorate, and sodium organic salts.

One alkali-ion conducting ceramic solid electrolyte or alkali-ion conducting ceramic membrane 8 is an electronic insulator and an excellent ionic conductor. The $Na_{1+x}Zr_2Si_xP_{3-x}O_{12}$ (where $0 \leq x \leq 3$) composition is the best known member of a large family of sodium-ion conducting ceramic solid electrolyte materials that have been extensively studied. The structure has hexagonal arrangement and remains stable through a wide variation in atomic parameters as well in the number of extra occupancies or vacancies.

One of ordinary skill in the art would understand that a number of ceramic powder processing methods are known for processing of the alkali-ion conducting ceramic solid electrolyte materials such as high temperature solid-state reaction processes, co-precipitation processes, hydrothermal processes, or sol-gel processes. In some embodiments of the present invention it may be advantageous to synthesize the alkali-ion conducting ceramic solid electrolyte materials by high temperature solid-state reaction processes. Specifically, ceramic the processing of $Na_{1+x}Zr_2Si_xP_{3-x}O_{12}$ (where $0 \leq x \leq 3$) and $Na_5RESi_4O_{12}$ NaSICON compositions (where RE is either Yttrium or a rare earth element) may proceed as follows. Alkali-ion conducting ceramic membranes may be systematically synthesized by solid-state oxide mixing techniques. A mixture of the starting precursors may be mixed in methanol in polyethylene jars, and the mixed precursor oxides are dried at 60° C. to evolve the solvent. The dried powder or material may be calcined at 800° C., to form the required composition, followed by wet ball milled with zirconium oxide media (or another media known to one of ordinary skill in the art) to achieve the prerequisite particle size distribution. One of ordinary skill in the art would understand that a number of polymers are known for processing with ceramic powders such as those set forth above as prerequisite for preparing a green-form, and that a number of conventional ceramic fabrication processing methods are known for processing ceramic membranes such as those set forth above in a green-form. Green-form membranes at 0.60 to 2.5 inch diameter sizes may be pressed by compaction in a die and punch assembly and then sintered in air at temperatures between 1100° C. and 1200° C. to make dense alkali-ion conducting ceramic membranes. XRD analysis of the alkali-ion conducting ceramic membranes may be performed to identify the NaSICON composition crystal structure and phase purity. Stoichiometric and non-stoichiometric compositions of the $Na_{1+x}Zr_2Si_xP_{3-x}O_{12}$ type formula (where $0 \leq x \leq 3$) are one type of alkali-ion conducting ceramic membrane 8 produced in this manner. Non-stoichiometric in this instance means un-equivalent substitution of Zr, Si, and/or P in the formula. The stability or resistance to corrosive media of the alkali-ion conducting ceramic membrane 8 materials described herein may be enhanced by chemistry variation The alkali-ion conducting ceramic membrane 8 may have flat plate geometry, tubular geometry, or supported geometry. The solid membrane 8 may be sandwiched between two pockets, made of a chemically-resistant HDPE plastic and sealed, by compression loading using a suitable gasket or o-ring, such as an EPDM (ethylene propylene diene monomer) rubber gaskets or o-ring.

The phrase "significantly impermeable to water", as used herein, means that a small amount of water may pass through the membrane 8, but that the amount that passes through is not of a quantity to diminish the usefulness of the sodium methoxide solution product. The phrase "essentially impermeable to water", as used herein, means that no water passes through or that if water passes through the membrane 8, its passage is so limited so as to be undetectable by conventional means. The words "significantly" and "essentially" are used similarly as intensifiers in other places within this specification.

The NaSICON materials or modified NaSICON materials referred herein are useful, for example, as sodium-ion conducting ceramic membranes in electrolytic cells. In one embodiment, the method for the production of sodium methoxide in methanol comprises introducing a solution of sodium methoxide in methanol into a catholyte compartment of an electrolytic cell, introducing an aqueous solution comprising one or more sodium salts into an anolyte compartment of the electrolytic cell, wherein the anolyte compartment and the catholyte compartment of the electrolytic cell are separated by a ceramic membrane 8 comprising NaSICON, applying electric potential across the electrolytic cell to selectively transport sodium ions from the anolyte compartment to the catholyte compartment where the sodium ions react with the methanol to form sodium methoxide in the catholyte compartment of the electrolytic cell, and wherein the composition of the solution of sodium methoxide in methanol in the catholyte compartment of the electrolytic cell comprises between at least about 2% by weight sodium methoxide and at most about 20% by weight sodium methoxide. In a further embodiment, the method comprises separation of the anolyte compartment and the catholyte compartment of the electrolytic cell by a ceramic membrane 8 comprising NaSICON, and a composition of the solution of sodium methoxide in methanol in the catholyte compartment of the electrolytic cell comprising between at least about 3% by weight sodium methoxide and at most about 15% by weight sodium methoxide. In a further embodiment, the method comprises separation of the anolyte compartment and the catholyte compartment of the electrolytic cell by a ceramic membrane 8 comprising NaSICON, and a composition of the solution of sodium methoxide in methanol in the catholyte compartment of the electrolytic cell comprising between at least about 5% by weight sodium methoxide and at most about 13% by weight sodium methoxide.

An example of an overall electrolytic reaction, using sodium hydroxide as the source of sodium ion, is as follows:

Anode: $2OH^- \rightarrow \frac{1}{2}O_2 + H_2O + 2e^-$

Cathode: $2CH_3OH + 2e^- + 2Na^+ \rightarrow 2NaOCH_3 + H_2$

Overall: $2CH_3OH + 2NaOH \rightarrow 2NaOCH_3 + H_2 + \frac{1}{2}O_2 + H_2O$

The reactions described above are electrolytic reactions, taking place under an induced current wherein electrons are introduced or are removed to cause the reactions. The reactions proceed only so long as a current is flowing through the cell. Contrary to electrolytic reactions, galvanic reactions may occur when an applied potential to the cell is removed, which tends to reduce the efficiency of the electrolytic cell. In one embodiment, only electrolytic reactions occur in the cell and galvanic reactions are eliminated or greatly minimized.

A method for producing sodium alkoxide, includes providing an electrolytic cell comprising at least one membrane configured to selectively transport sodium ions. The membrane is positioned between an anolyte compartment configured with an anode and a catholyte compartment configured with a cathode. A first solution comprising sodium alkoxide and alcohol is introduced or fed into the catholyte compartment of the electrolytic cell such that said first solution is in communication with the membrane and the cathode. A second solution comprising at least one sodium salt is introduced into the anolyte compartment of the electrolytic cell such that said second solution is in communication with the membrane and the anode. An electric potential is applied to the electrolytic cell such that sodium ions pass through the membrane and are available to undertake a chemical reaction with alcohol in the catholyte compartment to form sodium alkoxide. The concentration of the sodium alkoxide in the catholyte compartment of the electrolytic cell is maintained between about 2% by weight and about 20% by weight of the contents of the catholyte compartment. In one embodiment, the sodium alkoxide in the catholyte compartment of the electrolytic cell is maintained between about 3% by weight and about 15% by weight of the contents of the catholyte compartment. In another embodiment, the sodium alkoxide in the catholyte compartment of the electrolytic cell is maintained between about 5% by weight and about 13% by weight of the contents of the catholyte compartment. A solution comprising sodium alkoxide in alcohol is removed or received from the catholyte compartment. In one embodiment, the sodium alkoxide is sodium methoxide and the alcohol is methanol.

Introducing a first solution into the catholyte compartment includes introducing sodium alkoxide in a solution wherein the concentration of sodium alkoxide is between about 2% by weight and about 20% by weight of the solution. In other embodiments the sodium alkoxide introduced into the catholyte compartment of the electrolytic cell is between about 3% by weight and about 15% by weight of the contents of the solution being introduced into catholyte compartment. In another embodiment the sodium alkoxide introduced into the catholyte compartment of the electrolytic cell is between about 5% by weight and about 13% by weight of the contents of the solution being introduced into catholyte compartment.

The anolyte solution which is the source of the sodium cation or other alkali metal cation in the process may be a neutral salt, such as sodium chloride, or it may be a caustic solution such as sodium hydroxide. Solutions or by-products of industrial processes may be used as a sodium source. In one embodiment, aqueous sodium hydroxide is used. Sodium hydroxide is inexpensive and its use produces water and oxygen gas at the anode. Accordingly, although the discussion which follows is based on use of sodium hydroxide, it can be adapted to other alkali based chemicals, with the understanding that the reaction gas products at the anode will differ depending on the chemistry of the salt used in anolyte.

The sodium hydroxide (caustic) is fed or introduced into the anolyte compartment 4 of the electrolytic cell 2 through inlet 10. The sodium hydroxide solution may be of any grade or purity. In one embodiment, the purity of sodium hydroxide solution is not critical because the alkali-ion conducting ceramic membrane 8 comprising NaSICON material is selective to transport of sodium ions unlike organic membranes. Methanol or a solution of sodium methoxide in methanol is fed or introduced into the catholyte compartment 6 of the electrolytic cell 2 through the inlet 12, and wherein the composition of the solution of sodium methoxide in methanol in the catholyte compartment 6 of the electrolytic cell 2 comprises between at least about 2% by weight sodium methoxide and at most about 20% by weight sodium methoxide. In one embodiment, the methanol is free of moisture to increase the quality of sodium methoxide provided. In one embodiment, the catholyte compartment and/or the anolyte compartment is purged with one or more inert or nonflammable gases such as nitrogen and argon.

In some embodiments, for sodium methoxide production, the electrolytic cell may be operated at temperatures from about 20° C. to about 80° C., including about 25° C., 30° C., 40° C., 50° C., 60° C., and 70° C., and ranges of temperatures bounded by these enumerated temperatures. The temperature is maintained below the boiling point of the solutions used as catholyte. The electrolytic cell may also be operated at ambient pressure, with the pressure in the two compartments being substantially equal.

In one embodiment, under the influence of the electric potential, the sodium ions are transported from the anolyte compartment of the electrolytic cell across the ceramic membrane 8 to the catholyte compartment of the electrolytic cell where the sodium ions react with methanol to form sodium methoxide, while hydroxyl ions are oxidized at the anode to produce oxygen. In some such embodiments, the concentration of sodium ions in the anolyte compartment 4 is maintained in a desired range by a combination of introducing additional sodium hydroxide via anolyte inlet 10 into the anolyte compartment 4 and removing or receiving dilute or diluted sodium hydroxide (caustic) solution via anolyte outlet 16 from the anolyte compartment 4.

In one embodiment, as the reactions progress, the concentration of sodium methoxide in the catholyte compartment 6 begins to increase, and wherein the composition of the solution of sodium methoxide in methanol in the catholyte compartment 6 of the electrolytic cell 2 comprises between at least about 2% by weight sodium methoxide and at most about 20% by weight sodium methoxide. In one embodiment, once the concentration of sodium methoxide in the catholyte compartment 6 reaches a desired level, the product solution of sodium methoxide methanol is removed from the catholyte compartment 6 via catholyte outlet 14, and its volume is replaced by methanol or a more dilute solution of sodium methoxide in methanol through catholyte inlet 12, and wherein the composition of the solution of sodium methoxide in methanol in the catholyte compartment 6 of the electrolytic cell 2 comprises between at least about 2% by weight sodium methoxide and at most about 20% by weight sodium methoxide. The concentration of sodium methoxide in the catholyte outlet stream 14 may be monitored by any suitable means, including, but not limited to, specific gravity, sodium concentration, and other methods known in the art.

In embodiments of the electrolytic cell, the catholyte solution comprises one or more alkali alkoxides in one or more alcohols, and the anolyte solution comprises one or more aqueous inorganic and/or organic salts. In some specific embodiments, sodium salts in the anolyte solution include sodium hydroxide, sodium chloride, sodium carbonate, sodium bicarbonate, sodium sulfate, sodium chlorate, sodium nitrate, sodium phosphate, sodium perchlorate, sodium nitrite and other sodium based sodium salts, and combinations of two or more such salts. Salts of other alkali metals such as potassium, and lithium, and with these same anions, and other suitable anions, as well as combinations of salts having different anions, different cations or both, are also contemplated, including where sodium is not the metal cation being conducted by the electrolyte.

In one embodiment, the electrolytic cell 2 may be operated as a continuous operation (in a continuous mode) or as a batch operation (in a batch mode). For example, in continuous operation or mode, a first or catholyte solution is introduced into the catholyte compartment 6 of the electrolytic cell 2. A second or anolyte solution is introduced into the anolyte compartment 4. Thus, the anolyte compartment 4 is initially filled with anolyte solution comprising an alkali metal salt solution, and the catholyte compartment 6 is initially filled with catholyte solution comprising a solution of alkali alkoxide in alcohol with a composition of between at least about 2% by weight alkali alkoxide and at most about 20% by weight alkali alkoxide. An electric potential is applied across the electrolytic cell via anode 5 and cathode 7, and then, during operation, additional solutions are fed or introduced into the cell through the inlets 10, 12 and products, by-products, and/or diluted solutions are removed from the cell through the outlets 14, 16 and/or the venting means 18, 20 without ceasing operation of the cell, whilst maintaining the composition of the solution of alkali alkoxide in alcohol in the catholyte compartment 6 to comprise between at least about 2% by weight alkali alkoxide and at most about 20% by weight alkali alkoxide.

In another embodiment of continuous operation for the electrolytic cell 2, the anolyte compartment 4 is initially filled with anolyte solution comprising an alkali metal salt solution, the catholyte compartment 6 is initially filled with catholyte solution comprising a solution of alkali alkoxide in alcohol with a composition of between at least about 3% by weight alkali alkoxide and at most about 15% by weight alkali alkoxide, an electric potential is applied across the electrolytic cell via anode 5 and cathode 7, and then, during operation, additional solutions are fed or introduced into the cell through the inlets 10, 12 and products, by-products, and/or diluted solutions are removed from the cell through the outlets 14, 16 and/or the venting means 18, 20 without ceasing operation of the cell, whilst maintaining the composition of the solution of alkali alkoxide in alcohol in the catholyte compartment 6 to comprise between at least about 3% by weight alkali alkoxide and at most about 15% by weight alkali alkoxide.

In another embodiment of continuous operation for the electrolytic cell 2, the anolyte compartment 4 is initially filled with anolyte solution comprising an alkali metal salt solution, the catholyte compartment 6 is initially filled with catholyte solution comprising a solution of alkali alkoxide in alcohol with a composition of between at least about 5% by weight alkali alkoxide and at most about 13% by weight alkali alkoxide, an electric potential is applied across the electrolytic cell via anode 5 and cathode 7, and then, during operation, additional solutions are fed introduced into the cell through the inlets 10, 12 and products, by-products, and/or diluted solutions are removed from the cell through the outlets 14, 16 and/or the venting means 18, 20 without ceasing operation of the cell, whilst maintaining the composition of the solution of alkali alkoxide in alcohol in the catholyte compartment 6 to comprise between at least about 5% by weight alkali alkoxide and at most about 13% by weight alkali alkoxide.

Continuous operation may include introducing or feeding the second or anolyte solution and second or catholyte solutions continuously or intermittently such that the flow of a given solution is initiated or stopped according to the need for the solution and/or to maintain desired concentrations of solutions in the cell, without emptying one or both compartments. Similarly, continuous operation may include the removal of solutions from the anolyte compartment and the catholyte compartment continuously or intermittently. Control of the addition and/or removal of solutions from the cell may be done by any suitable means. Such means include manual operation, such as by one or more human operators, and automated operation, such as by using sensors, electronic valves, laboratory robots, etc. operating under computer or analog control. In automated operation, a valve or stopcock may be opened or closed according to a signal received from a computer or electronic controller on the basis of a timer, the output of a sensor, or other means. Examples of automated systems are well known in the art. Some combination of manual and automated operation may also be used. Alternatively, the amount of each solution that is to be added or removed per unit time to maintain a steady state may be experimentally determined for a given cell, and the flow of solutions into and out of the system set accordingly to achieve the steady state flow conditions.

In one embodiment of continuous operation for the electrolytic cell 2, the anolyte compartment 4 is initially filled with anolyte solution comprising an aqueous sodium salt solution, the catholyte compartment 6 is initially filled with catholyte solution comprising a solution of sodium methoxide in methanol with a composition of between at least about 2% by weight sodium methoxide and at most about 20% by weight sodium methoxide, an electric potential is applied across the electrolytic cell via anode 5 and cathode 7, and then, during operation, additional solutions are introduced into the cell through the inlets 10, 12 and products, by-products, and/or diluted solutions are removed from the cell through the outlets 14, 16 and/or the venting means 18, 20 without ceasing operation of the cell, whilst maintaining the composition of the solution of sodium methoxide in methanol in the catholyte compartment 6 to comprise between at least about 2% by weight sodium methoxide and at most about 20% by weight sodium methoxide.

In another embodiment of continuous operation for the electrolytic cell 2, the anolyte compartment 4 is initially filled with anolyte solution comprising an aqueous sodium salt solution, the catholyte compartment 6 is initially filled with catholyte solution comprising a solution of sodium methoxide in methanol with a composition of between at least about 3% by weight sodium methoxide and at most about 15% by weight sodium methoxide, an electric potential is applied across the electrolytic cell via anode 5 and cathode 7, and then, during operation, additional solutions are introduced into the cell through the inlets 10, 12 and products, by-products, and/or diluted solutions are removed from the cell through the outlets 14, 16 and/or the venting means 18, 20 without ceasing operation of the cell, whilst maintaining the composition of the solution of sodium methoxide in methanol in the catholyte compartment 6 to comprise between at least about 3% by weight sodium methoxide and at most about 15% by weight sodium methoxide.

In another embodiment of continuous mode operation for the electrolytic cell 2, the anolyte compartment 4 is initially filled with anolyte solution comprising an aqueous sodium salt solution, the catholyte compartment 6 is initially filled with catholyte solution comprising a solution of sodium methoxide in methanol with a composition of between at least about 5% by weight sodium methoxide and at most about 13% by weight sodium methoxide, an electric potential is applied across the electrolytic cell via anode 5 and cathode 7, and then, during operation, additional solutions are introduced into the cell through the inlets 10, 12 and products, by-products, and/or diluted solutions are removed from the cell through the outlets 14, 16 and/or the venting means 18, 20 without ceasing operation of the cell, whilst maintaining the composition of the solution of sodium methoxide in methanol in the catholyte compartment 6 to comprise between at least about 5% by weight sodium methoxide and at most about 13% by weight sodium methoxide.

In another embodiment, the electrolytic cell 2 may be operated as a batch operation in a batch mode. In one embodiment of batch operation for the electrolytic cell 2, the anolyte compartment 4 is initially filled with anolyte solution comprising an alkali metal salt solution, the catholyte compartment 6 is initially filled with catholyte solution comprising a solution of alkali alkoxide in alcohol with a composition of between at least about 2% by weight alkali alkoxide and at most about 20% by weight alkali alkoxide, an electric potential is applied across the electrolytic cell via anode 5 and cathode 7, and the electrolytic cell is operated with by-products removed from the cell through venting means 18, 20, until the desired concentration of alkali alkoxide in alcohol is produced in the catholyte compartment 6, whilst maintaining the composition of the solution of alkali alkoxide in alcohol in the catholyte compartment 6 to comprise between at least about 2% by weight alkali alkoxide and at most about 20% by weight alkali alkoxide. The electrolytic cell 2 is then emptied, the alkali alkoxide in alcohol product collected or received, and the electrolytic cell refilled to start the process again.

In another embodiment of batch operation for the electrolytic cell 2, the anolyte compartment 4 is initially filled with anolyte solution comprising an alkali metal salt solution, the catholyte compartment 6 is initially filled with catholyte solution comprising a solution of alkali alkoxide in alcohol with a composition of between at least about 3% by weight alkali alkoxide and at most about 15% by weight alkali alkoxide, an electric potential is applied across the electrolytic cell via anode 5 and cathode 7, and the electrolytic cell is operated with by-products removed from the cell through venting means 18, 20, until the desired concentration of alkali alkoxide in alcohol is produced in the catholyte compartment 6, whilst maintaining the composition of the solution of alkali alkoxide in alcohol in the catholyte compartment 6 to comprise between at least about 3% by weight alkali alkoxide and at most about 15% by weight alkali alkoxide.

In another embodiment of batch operation for the electrolytic cell 2, the anolyte compartment 4 is initially filled with anolyte solution comprising an alkali metal salt solution, the catholyte compartment 6 is initially filled with catholyte solution comprising a solution of alkali alkoxide in alcohol with a composition of between at least about 5% by weight alkali alkoxide and at most about 13% by weight alkali alkoxide, an electric potential is applied across the electrolytic cell via anode 5 and cathode 7, and the electrolytic cell is operated with by-products removed from the cell through venting means 18, 20, until the desired concentration of alkali alkoxide in alcohol is produced in the catholyte compartment 6, whilst maintaining the composition of the solution of alkali alkoxide in alcohol in the catholyte compartment 6 to comprise between at least about 5% by weight alkali alkoxide and at most about 13% by weight alkali alkoxide. Alternatively, combinations of continuous and batch operations may be used. Also, in either mode of operation, the introducing of solutions may be done using a pre-prepared solution or using components that form the solution in situ.

In one embodiment of batch operation for the electrolytic cell 2, the anolyte compartment 4 is initially filled with anolyte solution comprising an aqueous sodium salt solution, the catholyte compartment 6 is initially filled with catholyte solution comprising a solution of sodium methoxide in methanol with a composition of between at least about 2% by weight sodium methoxide and at most about 20% by weight sodium methoxide, an electric potential is applied across the electrolytic cell via anode 5 and cathode 7, and the electrolytic cell is operated with by-products removed from the cell through venting means 18, 20, until the desired concentration of sodium methoxide in methanol is produced in the catholyte compartment 6, whilst maintaining the composition of the solution of sodium methoxide in methanol in the catholyte compartment 6 to comprise between at least about 2% by weight sodium methoxide and at most about 20% by weight sodium methoxide. The electrolytic cell 2 is then emptied, the sodium methoxide in methanol product received, and the electrolytic cell refilled to start the process again. In another embodiment of batch operation for the electrolytic cell 2, the anolyte compartment 4 is initially filled with anolyte solution comprising an aqueous sodium salt solution, the catholyte compartment 6 is initially filled with catholyte solution comprising a solution of sodium methoxide in methanol with a composition of between at least about 3% by weight sodium methoxide and at most about 15% by weight sodium methoxide, an electric potential is applied across the electrolytic cell via anode 5 and cathode 7, and the electrolytic cell is operated with by-products removed from the cell through venting means 18, 20, until the desired concentration of sodium methoxide in methanol is produced in the catholyte compartment 6, whilst maintaining the composition of the solution of sodium methoxide in methanol in the catholyte compartment 6 to comprise between at least about 3% by weight sodium methoxide and at most about 15% by weight sodium methoxide. In another embodiment of batch operation for the electrolytic cell 2, the anolyte compartment 4 is initially filled with anolyte solution comprising an aqueous sodium salt solution, the catholyte compartment 6 is initially filled with catholyte solution comprising a solution of sodium methoxide in methanol with a composition of between at least about 5% by weight sodium methoxide and at most about 13% by weight sodium methoxide, an electric potential is applied across the electrolytic cell via anode 5 and cathode 7, and the electrolytic cell is operated with by-products removed from the cell through venting means 18, 20, until the desired concentration of sodium methoxide in methanol is produced in the catholyte compartment 6, whilst maintaining the composition of the solution of sodium methoxide in methanol in the catholyte compartment 6 to comprise between at least about 5% by weight sodium methoxide and at most about 13% by weight sodium methoxide. Alternatively, combinations of continuous and batch operation may be used. Also, in either mode of operation, the introducing or feeding of solutions may be done using a pre-prepared solution or using components that form the solution in situ.

In certain embodiments, introducing a first solution into the catholyte compartment includes recycling at least a portion of the solution received from the catholyte compartment back into the catholyte compartment. Additionally, introducing a second solution into the anolyte compartment comprises recycling at least a portion of the solution received from the anolyte compartment back into the anolyte compartment. In other embodiments, the entire contents of the anolyte or catholyte compartment or received, removed, or otherwise obtained and placed back into the respective compartment. In this manner, concentrations and pH levels or the respective compartments may be controlled or managed. For example in one embodiment, the pH of the solution in the second compartment is above about 4. In another embodiment, the pH of the solution in the second compartment is below about 7. In another embodiment, the pH of the solution in the second compartment is between about 4 and about 7. Various pH levels can be maintained and/or controlled in either compartment in the production of alkali alkoxides including sodium alkoxide and sodium metholate.

It should be noted that both continuous and batch operation may have dynamic flow of solutions. In one embodiment for continuous mode operation, anolyte make up solution is added via anolyte inlet 10 to maintain the sodium ion concentration at a certain concentration in the anolyte compartment 4. In one embodiment of batch mode operation, a certain quantity of sodium ions are removed from anolyte compartment 4 due to sodium ion transfer through the ceramic membrane 8 into the catholyte compartment 6, wherein the batch mode operation is stopped when the sodium ion concentration in the anolyte compartment 4 reduces to a certain amount or when the appropriate sodium methoxide concentration is reached in the catholyte compartment 6, whilst maintaining the composition of the solution of sodium methoxide in methanol in the catholyte compartment 6 to comprise between at least about 2% by weight sodium methoxide and at most about 20% by weight sodium methoxide.

In one embodiment, continuous mode operation in connection with the electrolytic cell 2 embodiment of FIG. 1 involves continuous introduction of methanol or a dilute solution of sodium methoxide in methanol into the catholyte compartment 6 and removal of product solution at a desired concentration of sodium methoxide in methanol from the catholyte compartment 6, whilst maintaining the composition of the solution of sodium methoxide in methanol in the catholyte compartment 6 to comprise between at least about 2% by weight sodium methoxide and at most about 20% by weight sodium methoxide. This is paired with addition of sodium hydroxide (and/or another sodium salt) to the anolyte compartment 4 so that the concentration of the sodium hydroxide is substantially balanced with the concurrent transport of sodium ions across the sodium-ion conducting ceramic membrane 8.

In one embodiment, batch operation involves charging the anolyte compartment 4 of the electrolytic cell 2, or in other words introducing into the anolyte compartment, a feed salt solution comprising an aqueous sodium salt solution, charging the catholyte compartment 6 of the electrolytic cell 2, or in other words introducing into the catholyte compartment 6 of the electrolytic cell, a dilute sodium methoxide solution in methanol comprising a composition of between at least about 2% by weight sodium methoxide and at most about 20% by weight sodium methoxide, and operating the electrolytic cell at the desired temperature and voltage until a product solution of sodium methoxide in methanol having a desired concentration is obtained in the catholyte compartment 6, whilst maintaining the composition of the solution of sodium methoxide in methanol in the catholyte compartment 6 to comprise between at least about 2% by weight sodium methoxide and at most about 20% by weight sodium methoxide. Electrolytic cells of the present invention employing alkali-ion conducting ceramic membranes comprising NaSICON material may be operated using relatively pure anolyte solutions, or by using relatively impure anolyte solutions such as by-products and contaminated impure caustic from industrial chemical processes. In one embodiment, caustic solutions of 50% by weight sodium hydroxide concentration are used.

The methods of the present invention, including those described above, are clean in that essentially all materials made from the process are useful, recyclable, and/or not environmentally harmful. For example, the dilute caustic solution discharged from the anolyte compartment 4 via anolyte outlet 16 may be concentrated and then used again, including being recycled back into this process. The oxygen 18 and hydrogen 20 gases produced at the anolyte compartment and the catholyte compartment, respectively, may be collected, transported, and/or pressurized for use. The gas may also be run through a condenser or a scrubber to remove impurities. The hydrogen gas produced can be used as a fuel or in an alternative energy source such as fuel cells. In one embodiment, the hydrogen gas produced by the cell is used, directly or indirectly, to power the cell and/or its components. Alternatively, the gaseous output may be vented to the environment, with or without the use of scrubbers, fire suppressors, or other safety precautions.

Methods using sodium hydroxide as a starting solution may also be generally cost effective as compared to other methods where sodium metal is reacted directly with methanol to form sodium methoxide. Sodium hydroxide is easier and safer to handle than sodium metal, which requires special storage, handling, and delivery systems to prevent auto-ignition of sodium metal or its violent exothermic reaction with water in the environment. Sodium hydroxide is generally also less expensive than sodium metal for an equivalent molar quantity of sodium atoms.

The sodium alkoxide produced in one embodiment has a high purity, with the purity being primarily limited by the purity of alcohol that is used as a starting material. Sodium alkoxide solutions are also substantially free of mercury and/or other heavy metals. As used herein, "substantially free" of mercury is a broad functional term that includes where there is essentially no mercury detectable within test limits ("essentially free") and where there is a small amount of mercury detected, but not at a quantity to limit the material's use in biodiesel production. In one embodiment, the amount of mercury in the solution is not detectable by methods of detection used in the art. In another embodiment, the sodium alkoxide solution is colorless or substantially colorless.

Figure 2:
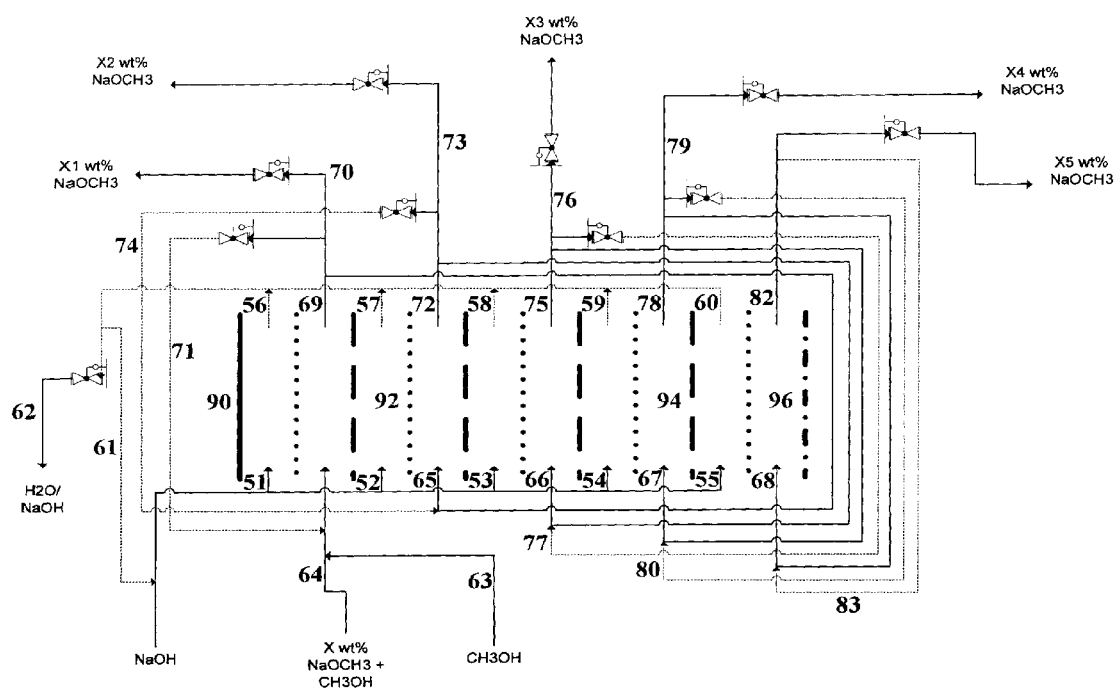
FIG. 2 is a schematic representation of another embodiment of the present invention showing a series of five electrolytic cells in accordance with the present invention.

Referring now to FIG. 2, a schematic representation of a series of five electrolytic cells that can be used in a process for producing alkali alkoxides according to the present invention is shown. As will be apparent to those skilled in the art, various configurations are possible for multiple electrolytic cells as depicted in FIG. 2 in accordance with principles described herein. In one such embodiment to make solutions of sodium methoxide ($NaOCH_3$) in methanol ($CH_3OH$), the electrolytic cells in FIG. 2 comprises sodium-ion conducting ceramic membranes 92 comprising NaSICON to separate each electrolytic cell into a catholyte compartment and an anolyte compartment. Adjacent electrolytic cells are connected by a bipolar electrode 94, comprising an anode-side and a cathode-side, except for the end terminal cells that comprise an anode 90 or a cathode 96 respectively. In one embodiment the series of five electrolytic cells in FIG. 2 are operated as a continuous operation or in a continuous mode, where aqueous sodium hydroxide (NaOH) solutions are fed or introduced via feed lines 51, 52, 53, 54, and 55 respectively into the anolyte compartments of each cell, and sodium-ion depleted aqueous sodium hydroxide solutions are removed from the anolyte compartments of each cell via product lines 56, 57, 58, 59, and 60 respectively. The sodium-ion depleted aqueous sodium hydroxide solutions may be recycled to the anolyte compartments of each cell via recycle line 61 or disposed from the system via line 62. The initial feedstock of sodium methoxide in methanol at X % by weight sodium methoxide is provided or introduced via feed line 64, and may be mixed with methanol provided or introduced via feed line 63, such that the combined effect of feed lines 63 and 64 is an initial feed or introduction of at least about 2% by weight sodium methoxide and at most about 20% by weight sodium methoxide. Solutions of sodium methoxide in methanol are introduced via feed lines 64, 65, 66, 67, and 68 respectively into the catholyte compartments of each cell, and sodium methoxide enriched solutions of sodium methoxide in methanol are removed from the catholyte compartments of each cell via product lines 69, 72, 75, 78, and 82 respectively. The sodium methoxide enriched solution of sodium methoxide in methanol removed from the catholyte compartments, may be introduced via product line 69 at X1% by weight sodium methoxide to the inlet side line 65 of catholyte compartment of the adjacent cell, may be introduced via product line 72 at X2% by weight sodium methoxide to the inlet side line 66 of catholyte compartment of the adjacent cell, may be introduced via product line 75 at X3% by weight sodium methoxide to the inlet side line 67 of catholyte compartment of the adjacent cell, and may be fed or introduced via product line 78 at X4% by weight sodium methoxide to the inlet side line 68 of catholyte compartment of the adjacent cell, where X1<X2<X3<X4<X5, and X1 is at least about 2% by weight sodium methoxide and X5 is at most about 20% by weight sodium methoxide. In another embodiment, the sodium methoxide enriched solution of sodium methoxide in methanol may be recycled via recycle lines 71, 74, 77, 80, and 83 respectively to the inlet side of catholyte compartments of the same cell. Alternatively, the sodium methoxide enriched solutions of sodium methoxide in methanol may be removed as product via product line 70 at X1% by weight sodium methoxide, product line 73 at X2% by weight sodium methoxide, product line 76 at X3% by weight sodium methoxide, product line 79 at X4% by weight sodium methoxide, and product line 82 at X5% by weight sodium methoxide, where X1<X2<X3<X4<X5, and X1 is at least about 2% by weight sodium methoxide and X5 is at most about 20% by weight sodium methoxide. In a further embodiment, X1<X2<X3<X4<X5, and X1 is at least about 3% by weight sodium methoxide and X5 is at most about 15% by weight sodium methoxide. In a further embodiment, X1<X2<X3<X4<X5, and X1 is at least about 5% by weight sodium methoxide and X5 is at most about 13% by weight sodium methoxide.

Several examples are provided below which discuss the construction, use, and testing of specific embodiments of the present invention. These embodiments are exemplary in nature and should not be construed to limit the scope of the invention in any way.

EXAMPLE 1

A HDPE scaffold was designed and manufactured at Ceramatec, to house four 5-cm diameter sodium-ion conducting ceramic membranes comprising $Na_{3.1}Zr_2Si_{2.3}P_{0.7}O_{12-\delta}$ NaSICON material to provide a membrane 8 active area of 60 $cm^2$. This scaffold was tested in a commercially available (ElectroCell MP manufactured by ElectroCell A/S, Denmark) plate-and-frame prototype electrolytic cell similar to the electrolytic cell 2 shown schematically in FIG. 1, to synthesize solutions of sodium methoxide in methanol in the catholyte compartment at various concentrations of sodium methoxide in the range from about 11 weight % sodium methoxide to about 30 weight % sodium methoxide. The ElectroCell MP was operated at 100 $mA/cm^2$ current density and at approximately 50° C. temperature for the anolyte compartment and catholyte compartment. The sodium transfer efficiency of the anolyte and catholyte was above 90%.

Figure 3:
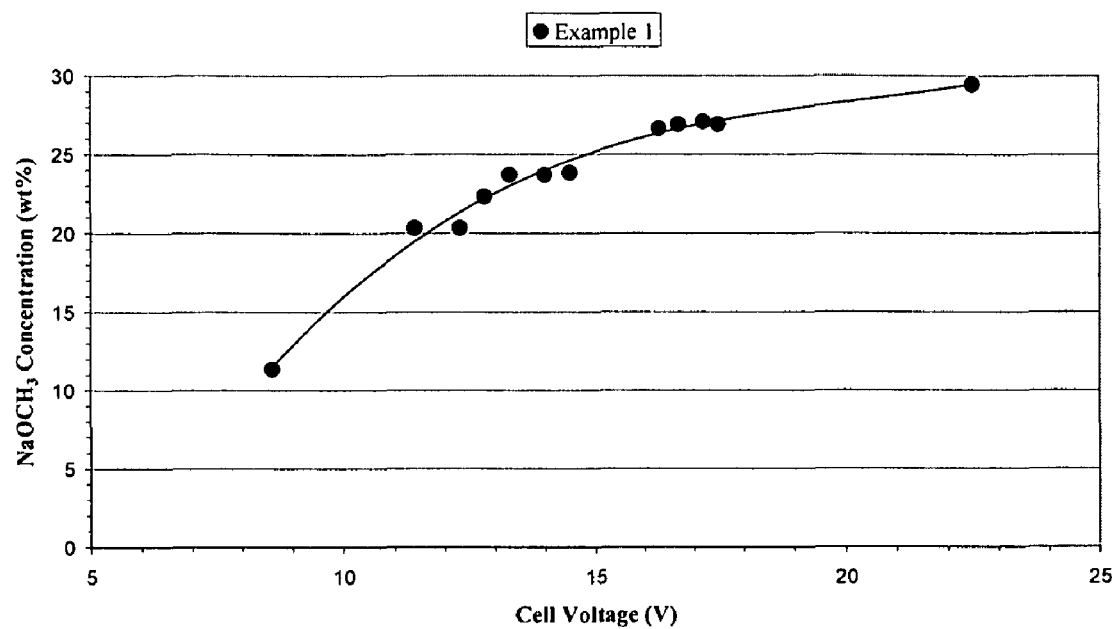
FIG. 3 is a plot graph of electrolytic cell voltage versus concentration of sodium methoxide for solutions of sodium methoxide in methanol using the embodiment of FIG. 1 according to Example 1.

Referring now to FIG. 3, a plot graph showing electrolytic cell voltage versus concentration of sodium methoxide for solutions of sodium methoxide in methanol using the embodiment of FIG. 1 is illustrated. The plot graph shows the electrolytic cell voltage required to achieve various concentrations of sodium methoxide in methanol in the range from about 11 weight % sodium methoxide to about 30 weight % sodium methoxide, in the catholyte compartment of the ElectroCell MP electrolytic cell operating at 100 $mA/cm^2$ current density with ceramic membranes comprising $Na_{3.1}Zr_2Si_{2.3}P_{0.7}O_{12-\delta}$ NaSICON material, and at approximately 50° C. temperature.

EXAMPLE 2

A HDPE scaffold was designed and manufactured at Ceramatec, to house four 5-cm diameter sodium-ion conducting ceramic membranes comprising $Na_{3.4}Zr_2Si_{2.4}P_{0.6}O_{12}$ NaSICON material to provide a membrane active area of 58 $cm^2$. This scaffold was tested in a commercially available (ElectroCell MP manufactured by ElectroCell A/S, Denmark) plate-and-frame prototype electrolytic cell similar to the electrolytic cell 2 shown schematically in FIG. 1, to synthesize solutions of sodium methoxide in methanol in the catholyte compartment at various starting concentrations of sodium methoxide in the range from about 1 weight % sodium methoxide to about 14 weight % sodium methoxide. The cathode was platinum-plated titanium (Pt/Ti) and the anode was nickel. The anolyte compartment contained about 15 weight % aqueous sodium hydroxide solution. The ElectroCell MP was operated at 100 $mA/cm^2$ current density and at approximately 50° C. temperature for the anolyte compartment and catholyte compartment. The sodium transfer efficiency of the anolyte and catholyte was 86% and 88% respectively.

Figure 4:
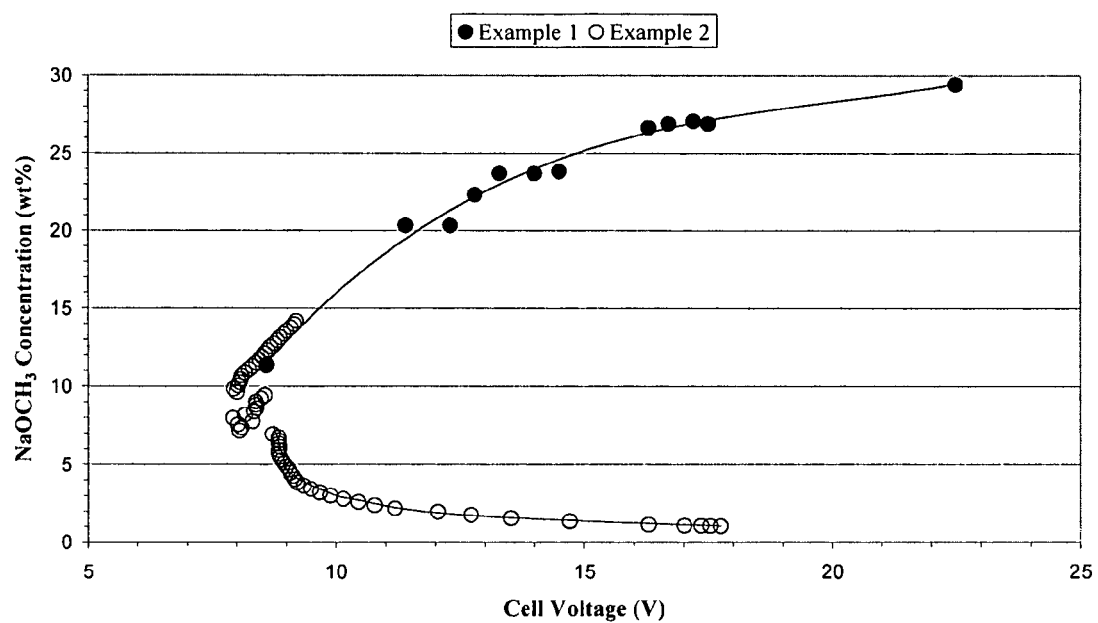
FIG. 4 is a plot graph of electrolytic cell voltage versus concentration of sodium methoxide for solutions of sodium methoxide in methanol using the embodiment of FIG. 1 according to Example 1 and Example 2.

Referring now to FIG. 4 a plot graph shows the electrolytic cell voltage required to achieve various concentrations of sodium methoxide in methanol in the range from about 1 weight % sodium methoxide to about 14 weight % sodium methoxide, in the catholyte compartment of the ElectroCell MP electrolytic cell operating at 100 mA/cm$^2$ current density with ceramic membranes comprising $Na_{3.4}Zr_2Si_{2.4}P_{0.6}O_{12}$ NaSICON material, and at approximately 50° C. temperature.

FIG. 4 also incorporates data from Example 1, and thereby by combining data from Example 1 and Example 2 shows the electrolytic cell voltage required to achieve various concentrations of sodium methoxide in methanol in the range from about 1 weight % sodium methoxide to about 30 weight % sodium methoxide, in the catholyte compartment of the ElectroCell MP electrolytic cell operating at 100 mA/cm$^2$ current density with ceramic membranes comprising NaSICON material, and at approximately 50° C. temperature. An analysis of FIG. 5 shows the benefit in one embodiment of minimizing electrolytic cell voltage by maintaining the composition of the solution of sodium methoxide in methanol in the catholyte compartment of the electrolytic cell between at least about 2% by weight sodium methoxide and at most about 20% by weight sodium methoxide, in a further embodiment the benefit of minimizing electrolytic cell voltage by maintaining the composition of the solution of sodium methoxide in methanol in the catholyte compartment of the electrolytic cell between at least about 3% by weight sodium methoxide and at most about 15% by weight sodium methoxide, and in yet a further embodiment the benefit of minimizing electrolytic cell voltage by maintaining the composition of the solution of sodium methoxide in methanol in the catholyte compartment of the electrolytic cell comprising between at least about 5% by weight sodium methoxide and at most about 13% by weight sodium methoxide.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features, materials and conditions. Similarly, the various features and steps discussed above, as well as other known equivalents for each such feature or step, can be mixed and matched by one of ordinary skill in this art to perform methods in accordance with principles described herein.

Although the invention has been disclosed in the context of certain embodiments, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein, but instead that it includes all modifications and alternatives coming within the true scope and spirit of the invention as embodied in the attached claims.

The invention claimed is:

1. A method for producing sodium alkoxide, comprising:
   providing an electrolytic cell comprising a plurality of ceramic membranes each configured to selectively transport sodium ions, and at least one bipolar electrode positioned between a pair of said membranes such that the electrolytic cell comprises a plurality of anolyte compartments and a plurality of catholyte compartments;
   introducing a first solution comprising sodium alkoxide and alcohol into at least one of the catholyte compartments of the electrolytic cell such that said first solution is in communication with at least one membrane and the bipolar electrode;
   introducing a second solution comprising at least one sodium salt into at least one of the anolyte compartments of the electrolytic cell such that said second solution is in communication with at least one membrane and the bipolar electrode; and
   applying an electric potential to the electrolytic cell such that sodium ions pass through the ceramic membranes and are available to undertake a chemical reaction with alcohol in at least one of the catholyte compartments to form sodium alkoxide.

2. The method of claim 1, wherein the alcohol comprises one of the group consisting of methanol, ethanol, n-propanol, isopropanol, n-butanol, tert-butanol, tert-amyl alcohol and combinations thereof.

3. The method of claim 1, wherein the sodium alkoxide comprises one of the group consisting of sodium methoxide, sodium ethoxide, sodium n-propoxide, sodium isopropoxide, sodium n-butoxide, sodium tert-butoxide, sodium tert-amoxide and combinations thereof.

4. The method of claim 1, wherein introducing a first solution into at least one of the catholyte compartments comprises a continuous or batch operation.

5. The method of claim 1, wherein introducing a first solution into at least one of the catholyte compartments comprises recycling at least a portion of the solution received from said at least one catholyte compartment back into said at least one catholyte compartment.

6. The method of claim 1, wherein introducing a second solution into at least one of the anolyte compartments comprises a continuous or batch operation.

7. The method of claim 1, wherein introducing a second solution into at least one of the anolyte compartments comprises recycling at least a portion of the solution received from said at least one anolyte compartment back into said at least one anolyte compartment.

8. The method of claim 1, wherein introducing a first solution into at least one of the catholyte compartments comprises introducing sodium alkoxide in a solution wherein the concentration of sodium alkoxide is between about 2% by weight and about 20% by weight of the solution.

9. The method of claim 1, wherein at least one of the ceramic membranes comprises a NaSICON material having the formula $Na_{1+x}Zr_2Si_xP_{3-x}O_{12}$ where $0 \leq x \leq 3$.

10. The method of claim 1, wherein at least one of the ceramic membranes comprises a NaSICON material having the formula $Na_5RESi_4O_{12}$ where RE is Y, Nd, Dy, or Sm, or any mixture thereof.

11. The method of claim 1, wherein at least one of the ceramic membranes comprises a non-stoichiometric sodium-deficient NaSICON material having the formula $(Na_5RESi_4O_{12})_{1-\delta}(RE_2O_{3.2}SiO_2)_\delta$, where RE is Nd, Dy, or Sm, or any mixture thereof and where $\delta$ is the measure of deviation from stoichiometry.

12. The method of claim 1, wherein the second solution introduced into at least one of the anolyte compartments comprises a sodium salt selected from the group consisting of: sodium hydroxide, sodium chloride, sodium carbonate, sodium bicarbonate, sodium sulfate, sodium chlorate, sodium chloride, sodium nitrate, sodium phosphate, sodium perchlorate, sodium nitrite, and any combination thereof.

13. The method of claim 1, wherein the second solution comprises a pH of greater than about 4.

14. The method of claim 1, wherein sodium methoxide in methanol solution is simultaneously received from a plurality of catholyte compartments.

15. The method of claim 1, wherein sodium methoxide is received from a first catholyte compartment and introduced into a second catholyte compartment to increase the concentration of the sodium methoxide in a sodium methoxide solution in successive catholyte compartments.

16. The method of claim 1, wherein the composition of the solutions of sodium methoxide in the catholyte compartments of the electrolytic cell comprises between about 2% by weight sodium methoxide and about 20% by weight sodium methoxide.

17. The method of claim 1, wherein the second solution introduced into the anolyte compartment comprises aqueous sodium hydroxide.

18. The method of claim 1, wherein at least one membrane operates at a current density of between about 20 mA/cm$^2$ and about 180 mA/cm$^2$.

19. The method of claim 18, wherein at least one membrane operates at a current density of about 100 mA/cm$^2$.

20. The method of claim 1 wherein the membranes comprise a monolithic flat plate, a monolithic tube, a monolithic honeycomb, or supported structures of the foregoing.

21. The method of claim 1, wherein at least one of the membranes comprises a layered sodium-ion conducting ceramic-polymer composite membrane, comprising sodium ion-selective polymers layered on sodium-ion conducting ceramic solid electrolyte materials.

22. The method of claim 1, wherein at least one of the membranes comprises a plurality of co joined layers of two or more different sodium-ion conducting ceramic materials.

23. A method for producing sodium methoxide, comprising:
providing an electrolytic cell comprising a plurality of ceramic membranes comprising a ceramic material each configured to selectively transport sodium ions, and at least one bipolar electrode positioned between a pair of said membranes such that the electrolytic cell comprises a plurality of anolyte compartments and a plurality of catholyte compartments;
introducing a first solution comprising sodium methoxide and methanol into at least one of the catholyte compartments of the electrolytic cell such that said first solution is in communication with at least one membrane and the bipolar electrode;
introducing a second solution comprising at least one sodium salt into at least one of the anolyte compartments of the electrolytic cell such that said second solution is in communication with at least one membrane and the bipolar electrode; and
applying an electric potential to the electrolytic cell such that sodium ions pass through the ceramic membranes and are available to undertake a chemical reaction with alcohol in at least one of the catholyte compartments to form sodium methoxide;
maintaining the concentration of the sodium methoxide in at least one of the catholyte compartment of the electrolytic cell between about 2% by weight and about 20% by weight of the contents of said at least one catholyte compartment; and
receiving a solution comprising sodium methoxide in methanol from at least one of the catholyte compartments.

24. The method of claim 23, wherein introducing a first solution into at least one of the catholyte compartments comprises a continuous or batch operation.

25. The method of claim 24, wherein introducing a first solution into at least one of the catholyte compartments comprises recycling at least a portion of the solution received from the at least one catholyte compartment back into said at least one catholyte compartment.

26. The method of claim 25, wherein introducing a second solution into at least one of the anolyte compartments comprises a continuous or batch operation.

27. The method of claim 26, wherein introducing a second solution into at least one of the anolyte compartments comprises recycling at least a portion of the solution received from the at least one anolyte compartment back into said at least one anolyte compartment.

28. The method of claim 23, wherein introducing a first solution into at least one of the catholyte compartments comprises introducing sodium methoxide in a solution wherein the concentration of sodium methoxide is between about 2% by weight and about 20% by weight of the solution.

29. The method of claim 23, wherein the second solution introduced into at least one of the anolyte compartments comprises a sodium salt selected from the group consisting of: sodium hydroxide, sodium chloride, sodium carbonate, sodium bicarbonate, sodium sulfate, sodium chlorate, sodium chloride, sodium nitrate, sodium phosphate, sodium perchlorate, sodium nitrite, and any combination thereof.

30. The method of claim 23, wherein at least one of the membranes comprises a NaSICON material having the formula $Na_{1+x}Zr_2Si_xP_{3-x}O_{12}$ where $0 \leq x \leq 3$.

31. The method of claim 23, wherein the membrane comprises a NaSICON material having the formula $Na_5RESi_4O_{12}$ where RE is Y, Nd, Dy, or Sm, or any mixture thereof.

32. The method of claim 23, wherein at least one of the membranes comprises a non-stoichiometric sodium-deficient NaSICON material having the formula $(Na_5RESi_4O_{12})_{1-\delta}(RE_2O_{3.2}SiO_2)_\delta$, where RE is Nd, Dy, or Sm, or any mixture thereof and where $\delta$ is the measure of deviation from stoichiometry.

33. The method of claim 23, wherein the second solution comprises a pH of greater than about 4.

34. The method of claim 33, wherein the second solution comprises a pH of less than about 7.

* * * * *